(12) United States Patent
Stefanksy

(10) Patent No.: US 6,226,143 B1
(45) Date of Patent: May 1, 2001

(54) DISK DRIVE HAVING SUPPORT POSTS ALIGNED WITH STORAGE DISK AND ACTUATOR MOUNTING POINTS TO REDUCE MECHANICAL OFF-TRACKING

(75) Inventor: Frederick Mark Stefanksy, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1166 days.

(21) Appl. No.: 08/562,796

(22) Filed: Nov. 27, 1995

Related U.S. Application Data

(63) Continuation of application No. 08/396,375, filed on Feb. 28, 1995, now abandoned, which is a continuation of application No. 07/902,489, filed on Jun. 23, 1992, now abandoned, which is a continuation-in-part of application No. 07/616,680, filed on Nov. 21, 1991, now abandoned, which is a continuation of application No. 07/387,944, filed on Jul. 31, 1989, now Pat. No. 5,025,335.

(51) Int. Cl.[7] .................................................. G11B 5/012
(52) U.S. Cl. ............................................................ 360/97.01
(58) Field of Search ........................... 360/97.01, 97.02, 360/98.01, 98.02, 137, 900, 901, 902, 903, 904

(56) References Cited

U.S. PATENT DOCUMENTS

| | | | |
|---|---|---|---|
| 4,639,863 | * | 1/1987 | Harrison et al. .................... 364/200 |
| 4,933,785 | * | 6/1990 | Morehouse et al. .............. 360/99.12 |
| 5,025,335 | * | 6/1991 | Stefansky ......................... 360/97.01 |

OTHER PUBLICATIONS

Prairie Tech Brochure, Copywrite 1988, Printed 6/88 "Take a Drive to the Future"—Prairie 220, 2.5 Inch Disk Drive.*
PC Week, "Support grows for 2.5 Inch Drives," May 8, 1989, vol. 6, No. 18, p. 12(1), Ziff–Davis Publishing Co.*

* cited by examiner

Primary Examiner—George J. Letscher
(74) Attorney, Agent, or Firm—Shawn B. Dempster; Edward Heller

(57) ABSTRACT

A two and one half inch form factor disk drive has a footprint with a length of substantially four inches and a width of substantially two and three-quarters inches. The disk drive includes a disk having a diameter of approximately 2.6 inches (65 mm), and the heads which read information from and write information to the disk are positioned only within a cylinder defined by the disk. A closed-loop, embedded servo tracking system provides a large storage capacity relative to the area of storage media available.

15 Claims, 10 Drawing Sheets

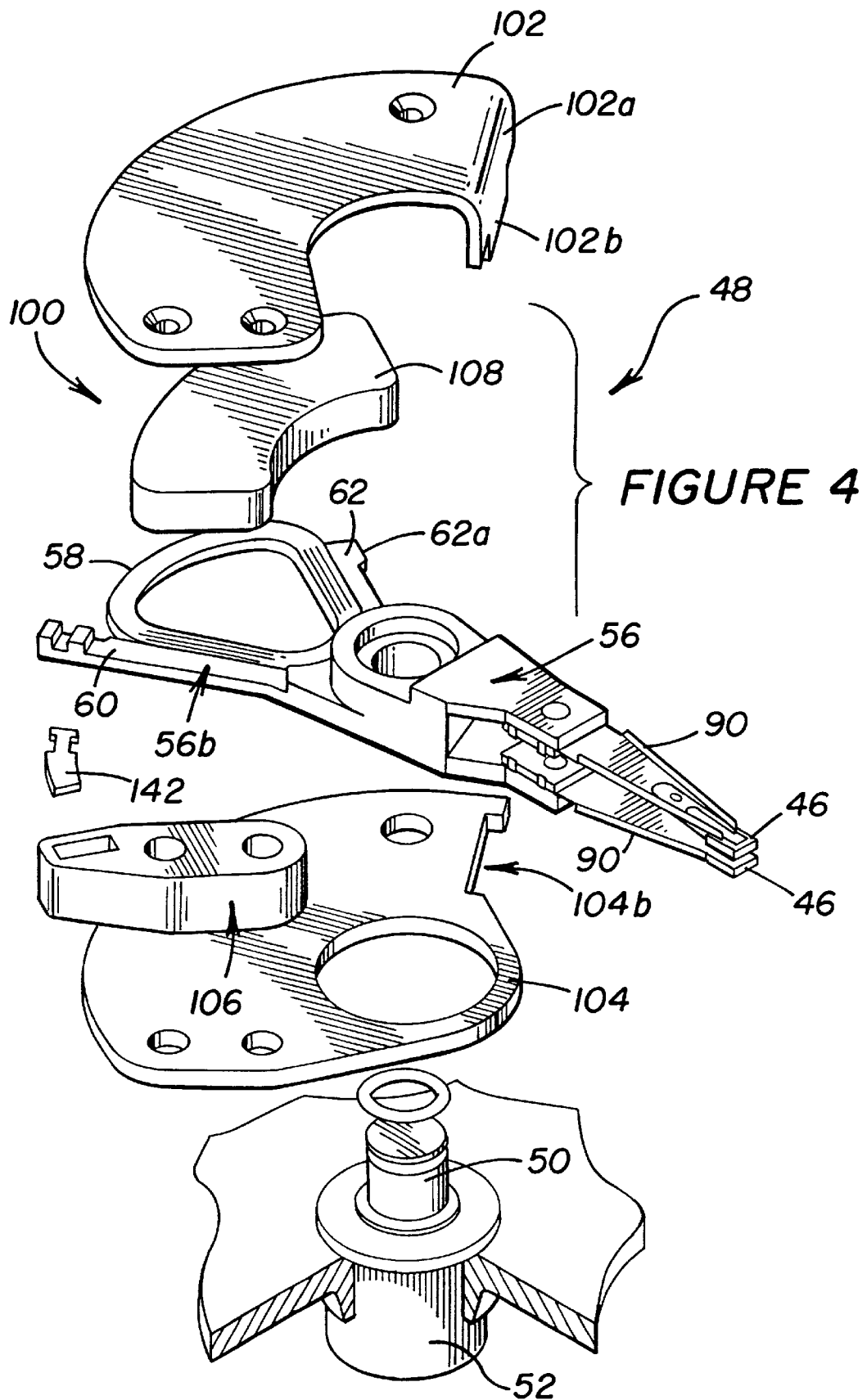

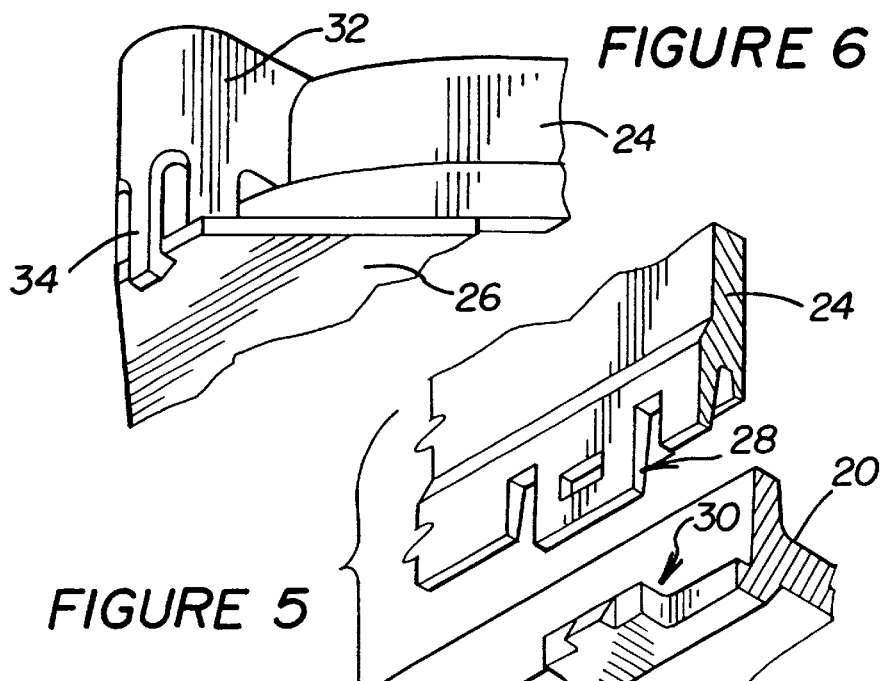
FIGURE 6
FIGURE 5
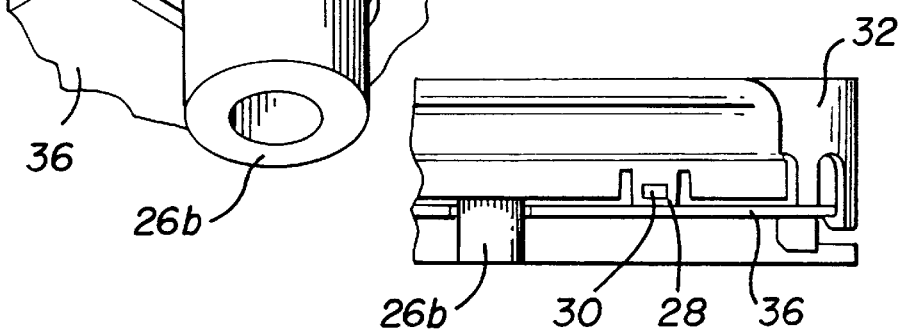
FIGURE 7
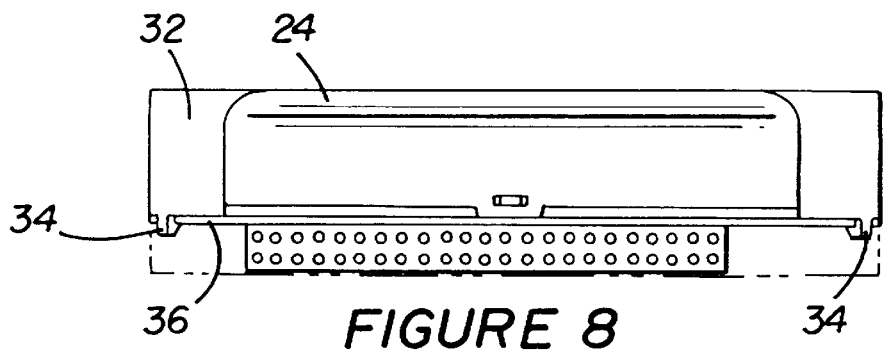
FIGURE 8

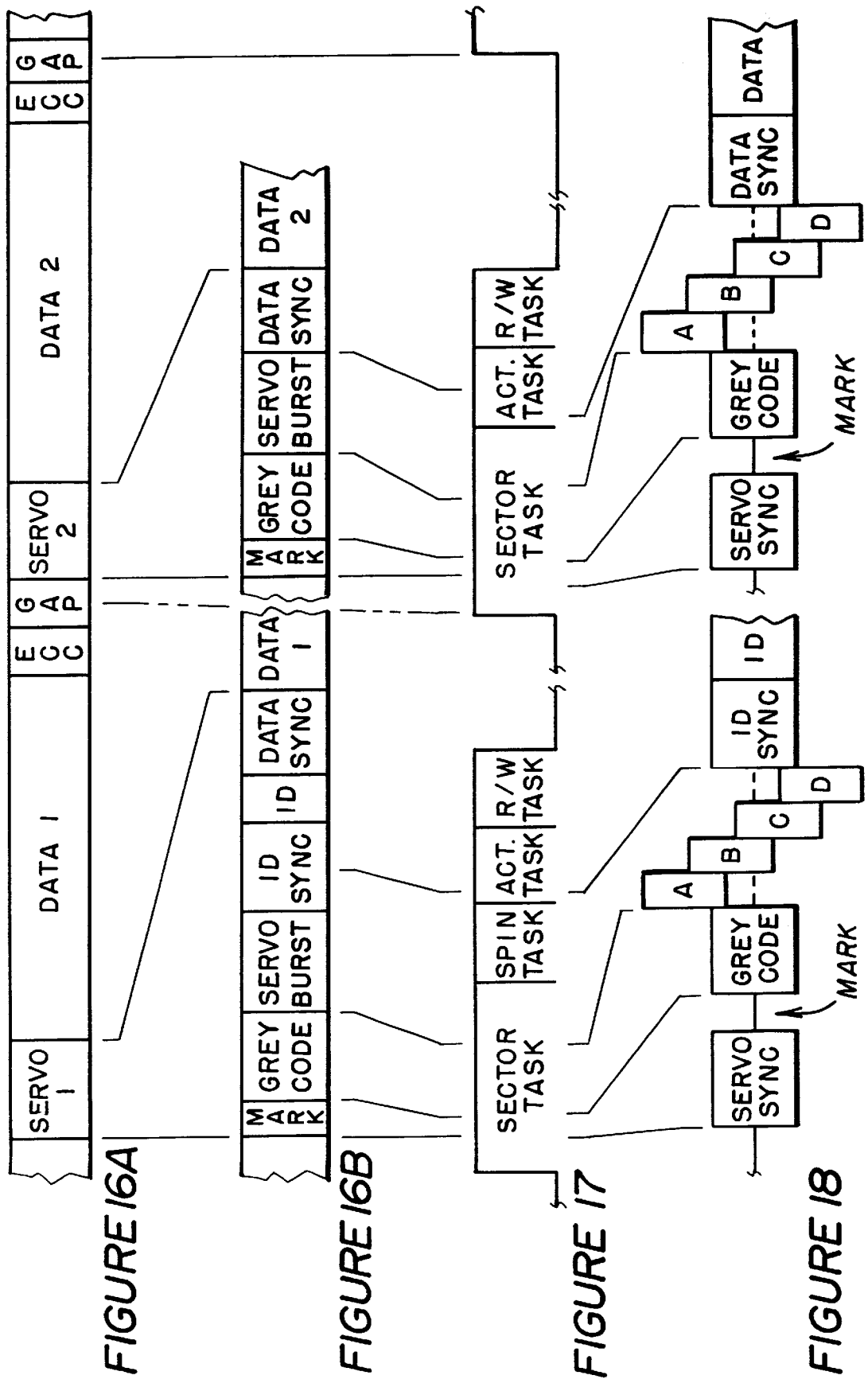

DISK DRIVE HAVING SUPPORT POSTS ALIGNED WITH STORAGE DISK AND ACTUATOR MOUNTING POINTS TO REDUCE MECHANICAL OFF-TRACKING

This application is a continuation of Ser. No. 08/396,375 filed Feb. 28, 1995, now abandoned, which is a continuation of Ser. No. 07/902,489, filed Jun. 23, 1992, now abandoned which is a continuation in part of Ser. No. 07/616,680, filed Nov. 21, 1991, now abandoned, which is a continuation of Ser. No. 07/387,944, filed Jul. 31, 1989, now U.S. Pat. No. 5,025,335.

CROSS-REFERENCE TO RELATED APPLICATIONS

ARCHITECTURE FOR SEALED DISK DRIVE, Ser. No. 664,659, filed Mar. 5, 1991, which is a divisional of Ser. No. 392,160, filed Aug. 8, 1989 (now U.S. Pat. No. 5,029,026), which is a divisional of Ser. No. 056,584, filed May 29, 1987 (now abandoned).

DISK DRIVE SYSTEM CONTROLLER ARCHITECTURE, Ser. No. 572,168, filed Sep. 14, 1990, which is a continuation of Ser. No. 057,289, filed Jun. 2, 1987, now U.S. Pat. No. 4,979,056, both assigned to the assignee of the present application;

DISK DRIVE SOFTWARE SYSTEM ARCHITECTURE, Ser. No. 488,386, filed Feb. 23, 1990, which is a continuation of Ser. No. 057,806, filed Jun. 2, 1987, now abandoned, both assigned to the assignee of the present application;

LOW-POWER, HARD DISK DRIVE SYSTEM ARCHITECTURE, Ser. No. 564,693, filed Aug. 7, 1990, which is a continuation of Ser. No. 152,069, filed Feb. 4, 1988, now abandoned, both assigned to the assignee of the present application;

MAGNETIC PARKING DEVICE FOR DISK DRIVE, Ser. No. 643,703, filed Jan. 22, 1991, which is a continuation of Ser. No. 269,873, filed Nov. 10, 1988, now abandoned, both assigned to the assignee of the present application; and DISK DRIVE SYSTEM USING MULTIPLE EMBEDDED QUADRATURE SERVO FIELDS, Ser. No. 386,504, filed Jul. 27, 1989, inventors Shrinkle, et al., assigned to the assignee of the present application.

BACKGROUND OF THE INVENTION

1. Field of the Invention

The present invention relates to disk drives; more particularly, to disk drives which have increased storage capacity and reduced size, weight and power consumption.

2. Description of the Related Art

The technology relating to data storage is following a continuing trend towards increased storage capacity, reduced data storage device weight and size, and reduced power consumption. Factors motivating these trends include the increasing use of portable or lap-top computers.

Reducing the size of disk drives has been balanced against the corresponding reduction in storage capacity caused by a reduction in the area of the storage medium. The sole attempt to introduce a disk drive smaller than the 3½" form factor is a drive announced by Prairie Tek having a disk with a diameter of 65 mm, which is 30 mm less than the diameter of the disks in the 3½" disk drives.

Disk drive manufacturers and computer manufacturers usually establish standards for vibration and shock resistance for hard disk drives or (disk files) for data storage. Among the criteria imposed on hard disk drives are vibration resistance, compactness, low weight, low power, and ease of manufacture—particularly reduced part count. All of these criteria are usually important to a computer manufacturer selecting a disk drive for use in a specific computer or for a specific type of application. The standards may be more stringent for disk drives intended for use in portable or lap-top computers or other harsh environments. Vibration and impact acceptance evaluations may be conducted by placing the drive being evaluated on a vibration table and subjecting the drive to vibrations of varying frequency and amplitude while the drive is operating. The performance of the drive is monitored to determine the frequency and amplitude of the applied vibrations which cause errors in seeking and/or track following. Seek and/or track following errors often result in "hesitations" in reading and/or writing data, and disk drives which are sensitive to applied vibrations of too low a frequency or amplitude may fail acceptance evaluations.

One effect of vibrations applied to a disk drive, and one cause of errors in seeking and/or track following is mechanical off-tracking, i.e., an unintended physical movement of the heads with respect to the disk(s). Mechanical off-tracking may be caused by movements of various structural components of the disk drive with respect to the disk.

Conventional disk drives have been fabricated of dense, heavy materials to provide the structural rigidity necessary to prevent thermal gradients and other physical stresses from causing mechanical off-tracking. The use of heavy materials such as metals has made it difficult to reduce the weight of the disk drive. The use of metals, particularly aluminum, to fabricate the support structure of a disk drive allows the coefficient of thermal expansion of the support structure to be matched to that of many of the internal components of the drive which are also usually fabricated of aluminum.

Disk drive systems utilizing closed-looped head positioning control systems rely on servo data stored on the rotating disks as the source of data track positioning feedback information. One approach to providing such servo information is to dedicate an entire disk surface and corresponding servo read data channel for the near-continuous sourcing and capture of positioning information. However, dedication of an entire disk surface and the need to provide special servo control read circuitry results in a significant increase in the cost per unit data of the disk drive control system and disk drive as a whole.

Conventional hard disk drives often incorporate a device for parking the head(s) of the drive. As used in this patent, the terms "park" and "parking" refer to maintaining the position of the head(s) over a selected portion (usually a "landing zone" at the inside or outside diameter) of the disk (or disks) by latching the actuator which supports the head(s). Many parking devices park the head(s) by physically engaging (latching) the actuator, and the terms "latched" and "unlatched" respectively refer to the engagement and disengagement of the parking device and the actuator. Physical shocks experienced during shipping or other non-operational movements of a disk drive may cause the head to "slap" against the disk, possibly causing a loss of data if the head slaps against a data-carrying portion of the disk. Parking the head assures that the head will land on the landing zone—i.e., a non-data storage portion of the disk—and will be held in a position over the landing zone during the power down period.

Electromagnetic parking devices require electrical power to release the parking device during operation of the disk drive. This use of electrical power is detrimental to the life of the batteries in a portable computer. Purely magnetic parking devices park the actuator by the attraction of and direct contact between a magnetically permeable portion of the actuator and a magnet. The primary drawback of a magnetic latch of this type is that during operation of the disk drive the rotational movement of the actuator is adversely affected by the attraction of the magnetically permeable portion of the actuator and the magnet, thereby creating problems with the track following and seek functions. Further, an extremely large force is required to release the actuator from the magnet.

SUMMARY OF THE INVENTION

It is therefore, an object of the present invention to provide a disk drive having reduced physical dimensions and reduced weight with a data storage capacity equivalent to drives having larger physical dimensions.

A further object of the present invention is to provide a disk drive having a lightweight molded plastic base and top cover which are attached to each other by snap-fit.

A still further object of the present invention is to provide a disk drive having dimensions establishing a two and one-half inch (2½") form factor.

Another object of the present invention is to provide a single disk drive having plastic structural components and a closed-looped, embedded servo control system utilizing a continuous band gray code and quadrature servo pattern field provided one or more times per track sector.

Another object of the present invention is to provide a disk drive in which the internal components of the disk drive supported by the base plate are glued to the base plate, and in which no screws are used to attach components to the base of the disk drive.

Another object of the present invention is to provide a disk drive having a total weight of less than five (5) ounces.

Another object of the present invention is to provide a disk drive in which the actuator coil is mounted between two arms of the actuator to reduce the height of the gap in which the actuator coil moves.

These and other objects of the present invention are accomplished by a disk drive having a base and cover formed of molded plastic to reduce weight, a single disk having a diameter of approximately 2.56 inches to reduce the length, width, and height of the drive, and a closed-looped, embedded servo disk drives and their control system to provide the single disk with a storage capacity equivalent to that provided by disk drives providing servo information on a separate disk surface.

A two and one-half inch (2.5") form factor disk drive in accordance with the present invention includes a base formed of molded plastic and having a length approximately equal to the width of a three and one-half inch (3.5") form factor disk drive and a width approximately equal to one-half of the length of a 3.5" form factor disk drive, a cover formed of molded plastic, said cover engaging said base by a plurality of snap-fit connectors to provide a controlled environment between said base and said cover, said cover including mounting brackets extending below said base when said base and cover are engaged, a printed circuit board supported by said mounting brackets of said cover, said printed circuit board including control means for providing control signals, a motor provided on said base, said motor having a support surface, storage means rotatably supported on said support surface of said motor, interactive means for reading information from and writing information on said storage means, and actuator means supported on said base plate for selectively positioning said interactive means with respect to said storage means in response to control signals.

BRIEF DESCRIPTION OF THE DRAWINGS

FIG. 4 is an exploded, isometric view of actuator arm and actuator motor of a disk drive in accordance with the present invention;

FIG. 5 is a partial, isometric view showing a snap-fit connector used to attach the cover to the base of a disk drive in accordance with the present invention;

FIG. 6 is a partial, isometric view, showing the interrelation of the base, cover and printed circuit board of a disk drive in accordance with the present invention;

FIG. 7 is a partial, side view of a disk drive in accordance with the present invention;

FIG. 8 is an end view of a disk drive in accordance with the present invention;

FIGS. 16A–B illustrate the distribution of servo control information and data in a simple, exemplary sector;

FIG. 17 illustrates the task management control system flow structure in processing the servo control information of the sector shown in FIGS. 16A–B; and FIG. 18 illustrates the detailed presentation of the servo control information of the exemplary sector, shown in FIGS. 16A–B.

DESCRIPTION OF THE PREFERRED EMBODIMENTS

A disk drive according to the present invention will be described with reference to FIGS. 1–18. The disk drive described herein includes, for example, a single hard disk with a magnetic coating and utilizes Winchester technology; however, the disk drive may utilize various numbers of disks (and a corresponding number of heads, usually one per disk surface—two (2) heads per disk) and other types of disks, for example, optical disks, and other read/write technologies, for example, lasers.

Advances in data storage technology and the reduced size of computers have led to disk drives having smaller dimensions. Eight inch (8") disk drives were followed by the five and one-quarter inch (5¼") disk drives. The length of a 5¼" drive is approximately the width of an 8" drive and the width of a 5¼" drive is approximately one-half of the length of an 8" drive. This same size relationship applies to so-called three and one-half inch (3½") drives and 5¼" drives—i.e., a 3½" drive is approximately one half the size of a 5¼" drive.

Many of the developments in disk drive technology which led to the current state of the art for disk drives for personal computers and work stations were made with respect to 5¼" disk drives and later incorporated into 3½" disk drives. In transferring these developments from 5¼" to 3½" drives, most parts remained the same and were shoe-horned into a 3½" drive.

The inventor of the disk drive which is the subject of this patent realized that further reductions in the size of disk drives would not be possible without redesigning certain components of the reduced size drive. Designing a disk drive which is smaller than the 3½" form factor drives has presented the challenge of redesigning these industry standard components; for example, the standard flexure used to mount a head on a load beam is a part which was designed by IBM and has survived many generations of disk drives.

The form factor selected for the disk drive of the present invention is a two and one-half inch (2½") form factor in which the length of the drive is approximately the width of a 3½" drive and the width is approximately one-half of the length of a 3½" drive. The dimensions of the disk drive of the present invention are: length 4"; width 2¾"; and height 0.68". Further, the disk drive weighs less than six (6) ounces. The disk has a diameter of approximately 2.56" (65 mm). Implementing the disk drive in a plug-in module would allow the disk drive to be easily transferred from one computer to another, e.g., from an office to a home computer.

The overall power consumption of the disk drive is less than 3.5 watts and the power consumption may be as low as 1.5 watts during idle periods. Thus, the disk drive is ideal for use in portable or other battery-powered computers. The power consumption of the disk drive is further reduced through the use of a sleep mode to less than 0.5 watts which is described in application Ser. No. 152,069, which is hereby incorporated by reference.

Figure 1:
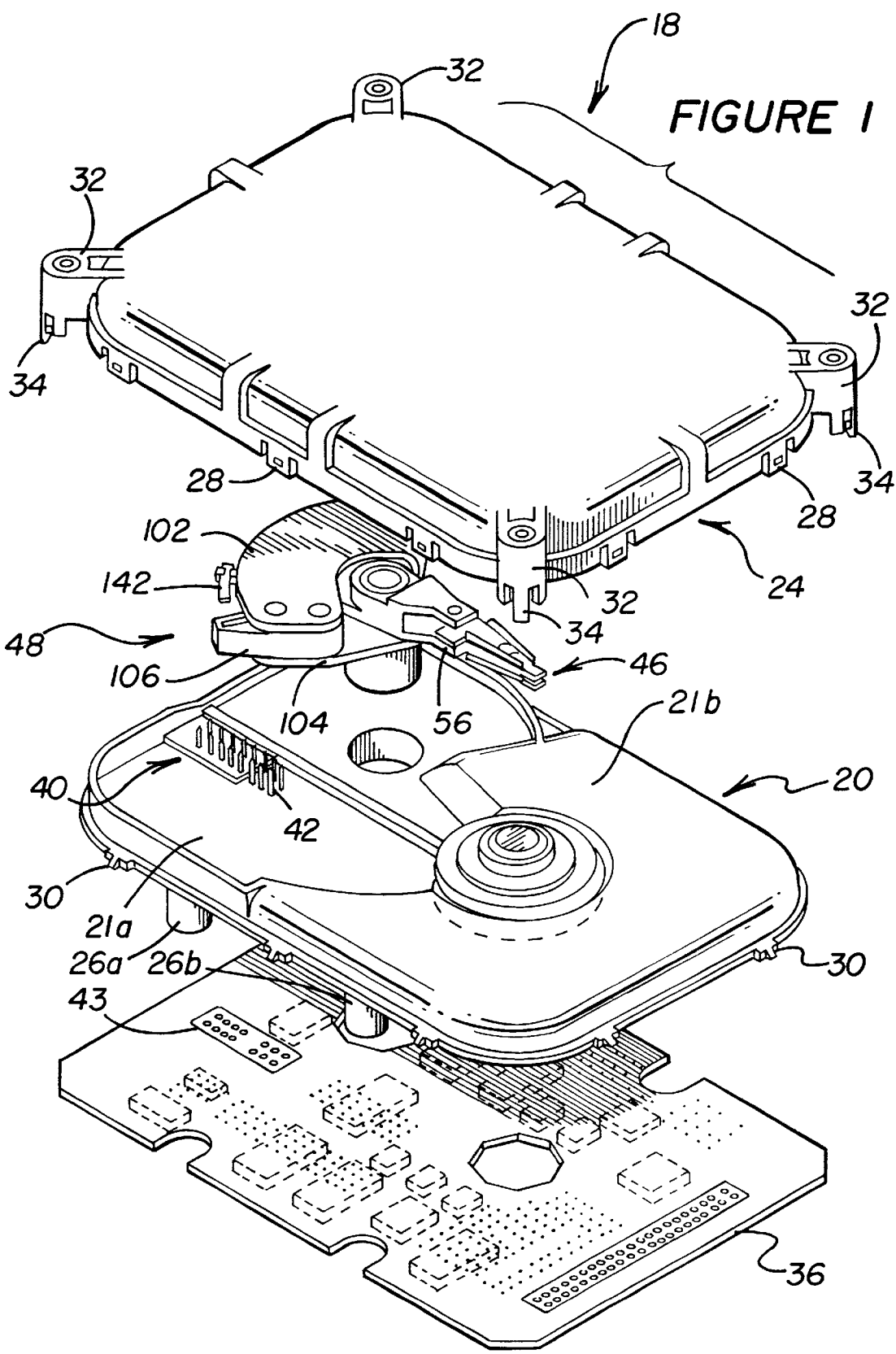
FIG. 1 is an exploded, isometric view of the base, cover and printed circuit board of a disk drive according to the present invention.
Figure 2:
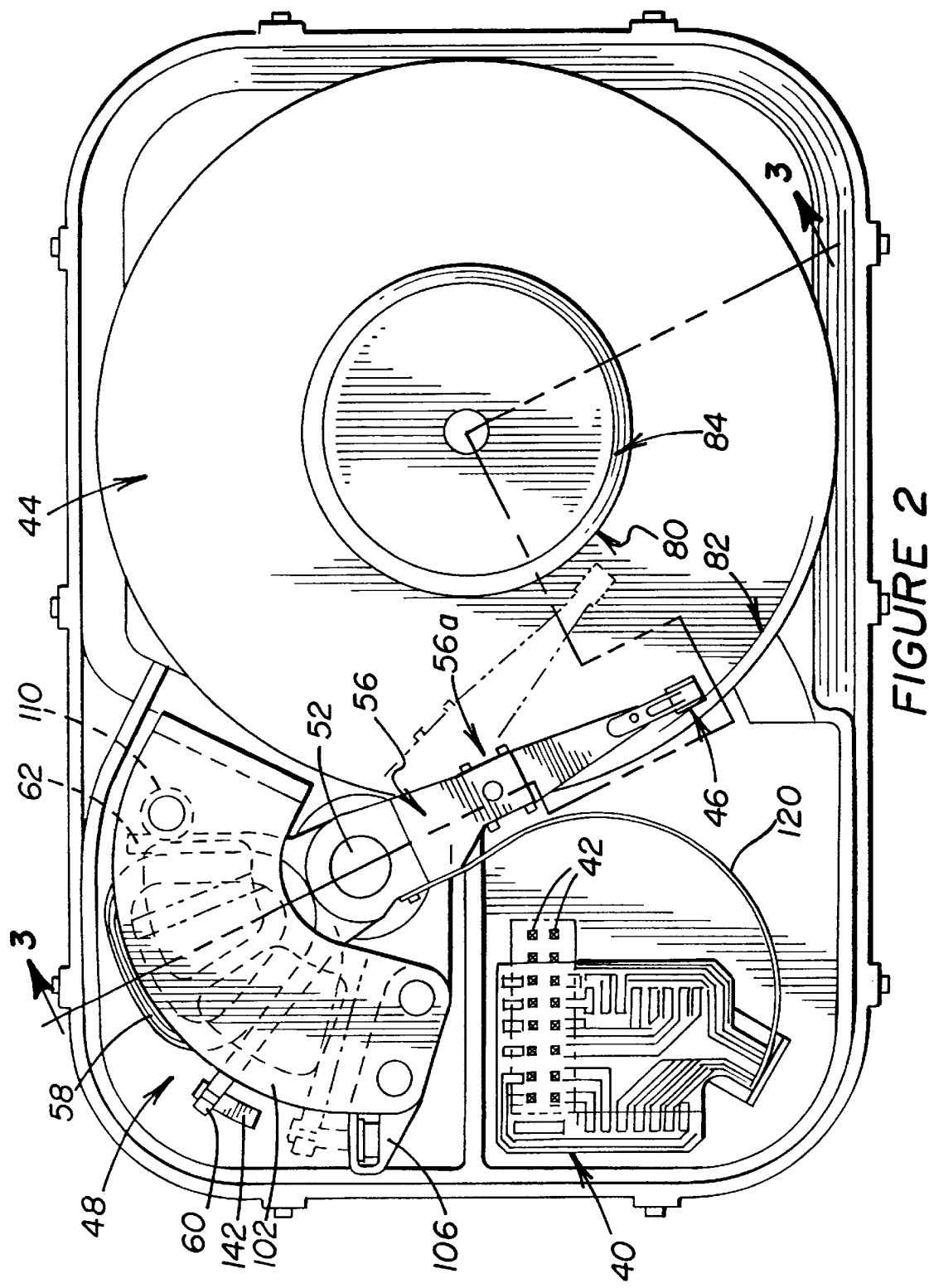
FIG. 2 is a plan view of a disk drive according to the present invention.
Figure 3:
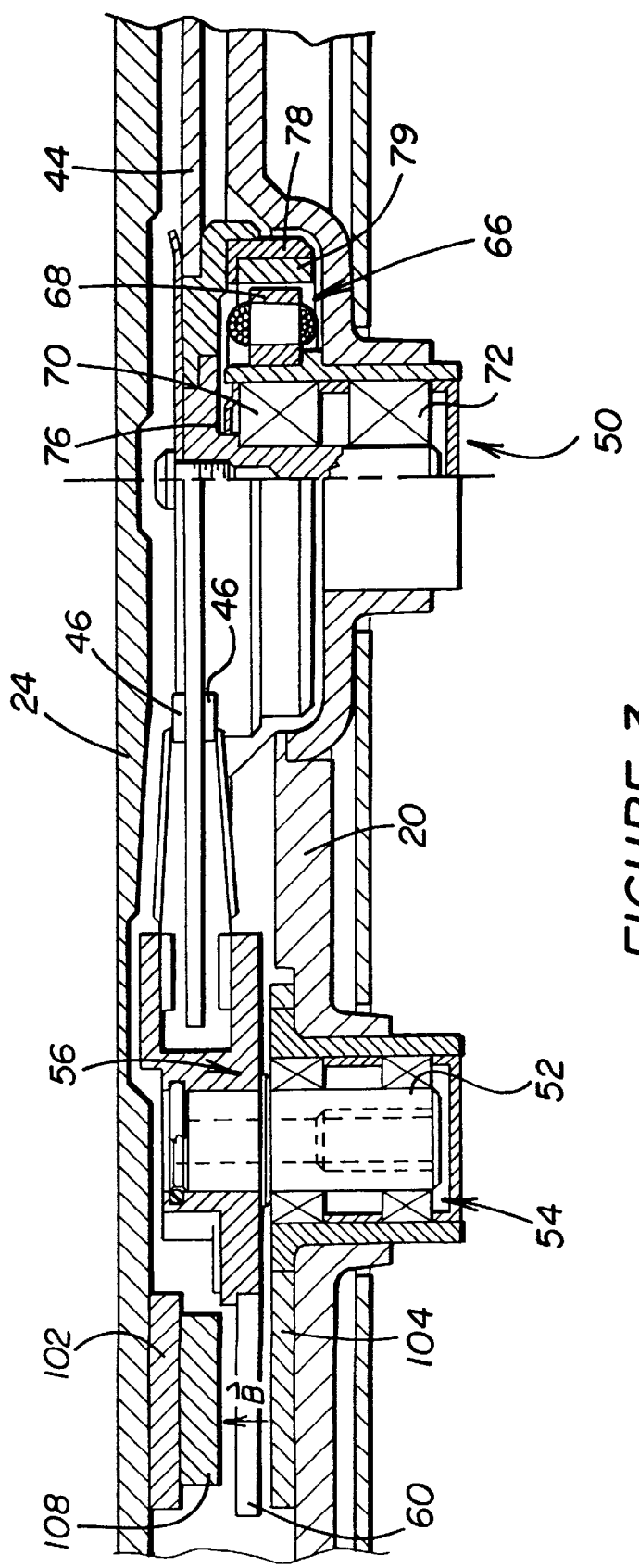
FIG. 3 is a cross-sectional view along line 3 in FIG. 2.
Figure 9A:
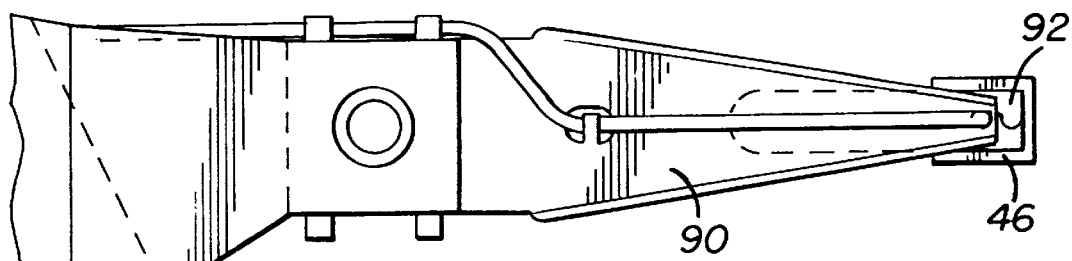
FIGS. 9A–C are partial, top, side, and bottom views, respectively, of an actuator arm for a disk drive in accordance with the present invention.
Figure 10:
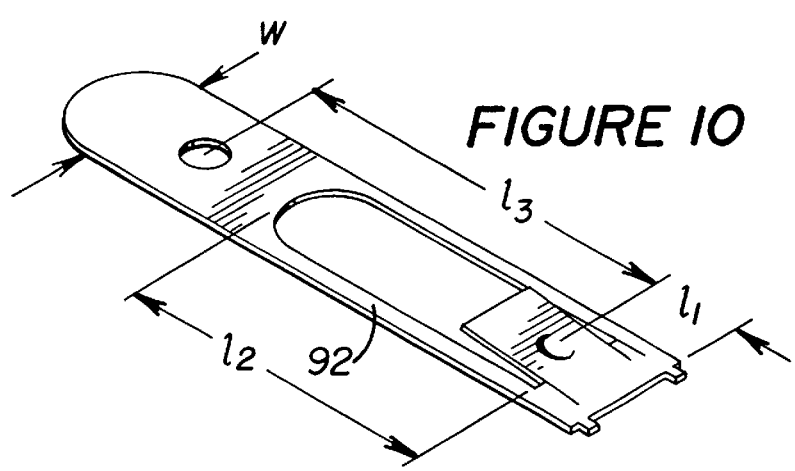
FIG. 10 is an isometric view of a flexure utilized to mount a head on a load beam in a disk drive in accordance with the present invention.
Figure 9B:
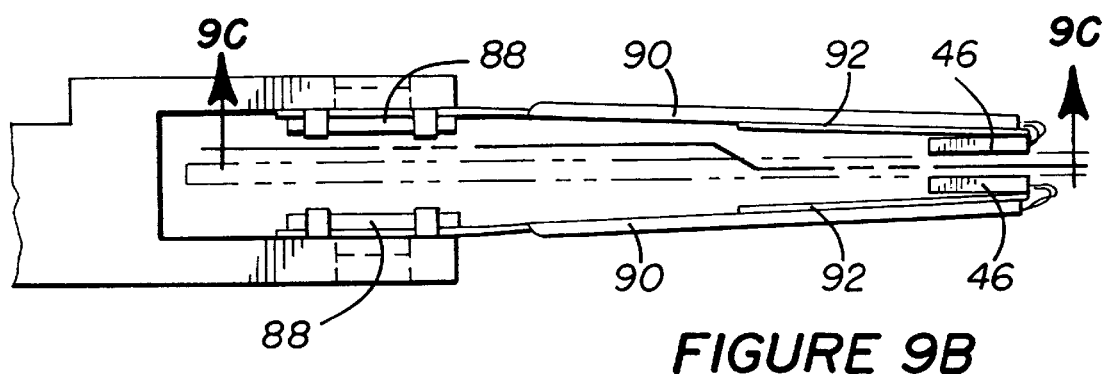
Figure 9C:
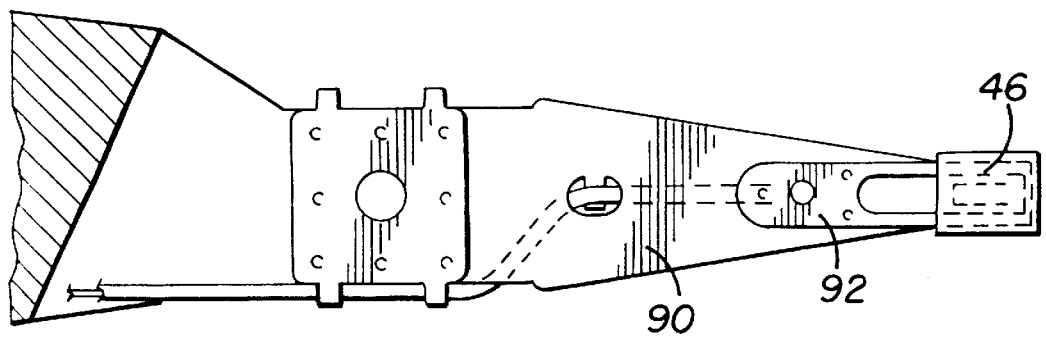

With reference to FIGS. 1–3, a disk drive 18 in accordance with the present invention includes a base 20 and a cover 24 which are formed of molded plastic. The use of molded plastic components allows base 20 and cover 24 to be attached to each other by a plurality of snap-fit connectors, each including a tab engagement member 28 on cover 24 which engages a tab 30 on base 20. A gasket (not shown) is provided between base 20 and cover 24 to establish a sealed (or controlled) environment between base 20 and cover 24. Disk drive 18 does not utilize a breather filter, and the seal provided by the gasket (not shown) isolates the sealed environment from ambient atmospheric conditions.

Mounting brackets (or inserts) 32, ultrasonically welded to cover 24, include snap-fit posts 34 which secure printed circuit board (PCB) 36 to the cover 24, with base 20 sandwiched between cover 24 and PCB 36. As detailed in FIG. 6, snap fit posts 34 secure PCB 36 to inserts 32 and thus cover 24. Screws (not shown) threaded into mounting posts 26a–d attach the disk drive to a computer (not shown) or other supporting structure. Mounting posts 26a–d are positioned to enhance the structural rigidity of base 20.

The molding of base 20 and cover 24 and the construction of snap-fit connectors 26 are in accordance with the snap-fit and injection molding guidelines published by the General Electric plastics division. Base 20 is molded from a plastic which yields a rigid structure, for example, Ultem D3452 with a 20% glass filler and a 20% mica filler. Cover 24 is designed to be more flexible than base 20 and is formed of a plastic which provides a resilient structure, for example, Ultem 1000, so that cover 24 conforms to base 20. The use of snap-fit connectors 26 eliminates the need for screws to assemble the disk drive, thereby reducing the weight of the disk drive, avoiding the need to provide tapped holes for screws, and simplifying the assembly procedure.

Printed circuit board (PCB) 36 has circuitry for operating the disk drive; in particular, the circuits provided on PCB 36 create control signals which control the operation of the components of the disk drive, as described below with reference to FIGS. 14–18. As shown in FIGS. 1 and 2, the horizontal surface of base 20 is divided into two portions, a first portion 21a which supports actuator assembly 48 and a second portion 21b underlying disk 44. Surface 21b is offset with respect to surface 21a to provide more distance between PCB 36 and surface 21b, thereby allowing integrated circuit components to be provided on PCB 36 in the region between PCB 36 and surface 21b. Accordingly, integrated circuit components may be provided on both surfaces of PCB 36.

A header assembly 40, comprising a plurality of holes in base 20 and a corresponding plurality of pins 42 press-fit in the holes in base 20, transfers control signals from PCB 36 to the controlled environment between base 20 and cover 24. Pins 42 of heads 40 plug directly into connector 43 on PCB 36. As shown in FIGS. 2 and 3, the components in the controlled environment include a disk 44, transducers (or heads) 46 for writing information on and reading information from first and second surfaces of disk 44, an actuator assembly 48 for positioning transducers 46 with respect to disk 44, and a spin motor 50 for rotating disk 44.

The rigid structure of base 20 and the compliant structure of cover 24 ensure that the heads 46 associated with the respective surfaces of disk 44 are positioned over tracks which lie in the same cylinder. A cylinder is a vertically oriented segment representing the same track on both surfaces of disk 44. Flexing of the structure supporting the heads 46, which are mounted on the actuator 48 at one location on base 20, and the disk 44, which is mounted on base 20 at another location in the disk drive 18, would cause tracking problems by moving different heads 46 by different amounts with respect to the first and second surfaces of disk 44. To prevent flexing of base 20, support posts 26a–d are located so that a box-shaped support region is established when support posts 26a–d engage the structure (for example, a computer (not shown)) to which disk drive 18 is mounted. The box-shaped support region includes the mounting points for actuator 48 and disk 44. The support region stiffens (reduces flexing of base 20), and thus prevents mechanical off-tracking.

Actuator assembly 48 (FIGS. 1, 2, and 4) performs the function of positioning heads 46 with respect to disk 44. Actuator arm 56 supports heads 46 mounted at a first end 56a of actuator arm 56, and an actuator coil 58 mounted on actuator sub-arms 60, 62 at a second end 56b of actuator arm 56; the first and second ends 56a, 56b of actuator arm 56 are located on opposite sides of shaft 52. Actuator arm 56 is mounted on shaft 50 by a bearing cartridge 52 which is glued into base 20. Actuator arm 56, including all of the components attached thereto, is precisely balanced, i.e., equal amounts of weight are provided on either side of the pivot point (the center of shaft 52) so that the pivoting of actuator arm 56 to position heads 46 is less susceptible to linear shock and vibration.

The force necessary to pivot actuator arm 56 is created by a voice coil motor including coil 58 and a magnet structure 100, which supports a bipolar magnet 108. The components of magnet structure 100, as described in detail below, are formed of magnetically permeable material to provide returns for the magnetic field generated by magnet 108. The magnet structure 100 and actuator coil 58 are arranged so that coil 58 is placed in the magnetic field created by magnet 108. Currents passing in opposite directions in coil 58 create torques in opposite directions so that actuator arm 56 may be pivoted to position heads 46 at selected locations between inside and outside diameters 80 and 82 a landing zone (or non-data area) 84 located, e.g., adjacent to the inside diameter 80 and the actuator assembly positions the heads 46 over landing zone 84 during parking. The landing zone 84 may be any selected portion of the disk 44; however, a portion of the disk 44 adjacent to the inside 80 or outside 82 diameter is usually selected.

Magnet structure 100 includes top and bottom plates 102, 104 formed of magnetically permeable material, support member 106 (also formed of magnetically permeable material and a part of a magnetic latch), and magnet 108 attached to the top plate 102. Top and bottom plates 102, 104 in conjunction with support member 106, function as returns for the magnetic fields provided by magnet 108. It is important that there are no air gaps between support member 106 and either the top or bottom plate 102, 104; any air gap would create a discontinuity in the return, greatly reducing the strength of the magnetic field. Top plate 102 has a bend so that the first end 102a of top plate 102 is angled with respect to the remaining portion of top plate 102. Providing a bend in top plate 102 avoids the use of a second support member 106, thus reducing hot spots in the magnetic circuit.

Magnet 108 is attached to top plate 102 (e.g., attached to top plate 102) to provide first and second magnetic fields $\vec{B}_1$, $\vec{B}_2$ between respective ones of the first and second (i.e., north and south) poles of magnet 108 and bottom plate 104. First and second magnetic fields $\vec{B}_1$, $\vec{B}_2$, are encompassed in a closed magnetic circuit including various portions of top plate 102, bottom plate 104, and support member 106. By containing the magnetic fields $\vec{B}_1$ and $\vec{B}_2$, in returns, the magnetic field intensity of each field is increased in the region between the respective first and second poles of magnet 108 and bottom plate 104; the strength of the magnetic field in this region is directly related to the torque which the voice coil exerts on the actuator arm 56, and thus the rotational (angular) velocity of actuator arm 56 and the seek times for the drive. Placing coil 58 between sub-arms 60, 62 instead of above or below sub-arms 60, 62 reduces the gap between magnet 108 and bottom plate 104, thereby decreasing flux leakage and increasing the strength of fields $\vec{B}_1$ and $\vec{B}_2$.

Actuator assembly 48 provides access times of less than 20 milliseconds, due to the high power-to-mass ratio and the small moment of inertia of actuator arm 56. Actuator arm 56 has a moment of inertia which is approximately one third of the moment of inertia of the actuator arm in a conventional 3½" disk drive.

In the past it has been believed that the structural rigidity necessary to prevent mechanical off-tracking could only be provided by a metal structure. However, the design of base 20 and cover 24, as described herein, coupled with a closed-loop, embedded servo tracking system avoid and, if necessary, compensate for mechanical off-tracking. The closed-loop, embedded servo tracking system and the rigid structure of base 20 also provide a storage capacity of approximately 20 Mb using a single disk with a data area having an inside radius of approximately 0.837 inches and an outside radius of approximately 1.23 inches (i.e., a data storage area of approximately 5.10 square inches), a track density of 1700 tracks per inch and 22,000 flux changes per inch. A closed-loop, embedded servo tracking is described in applications Ser. Nos. 057,806 (entitled DISK DRIVE SOFTWARE SYSTEM ARCHITECTURE), Ser. No. 057,289 now U.S. Pat. No. 4,979,056, (entitled DISK DRIVE SYSTEM CONTROLLER ARCHITECTURE) and Ser. No. 386,504 (entitled DISK DRIVE SYSTEM USING MULTIPLE EMBEDDED QUADRATURE SERVO FIELDS), filed Jul. 27, 1989, Inventors: Louis J. Shrinkle and John P. Squires, which are hereby incorporated by reference. Pertinent portions of the disclosures of these incorporated Applications are set forth below.

Figure 14:
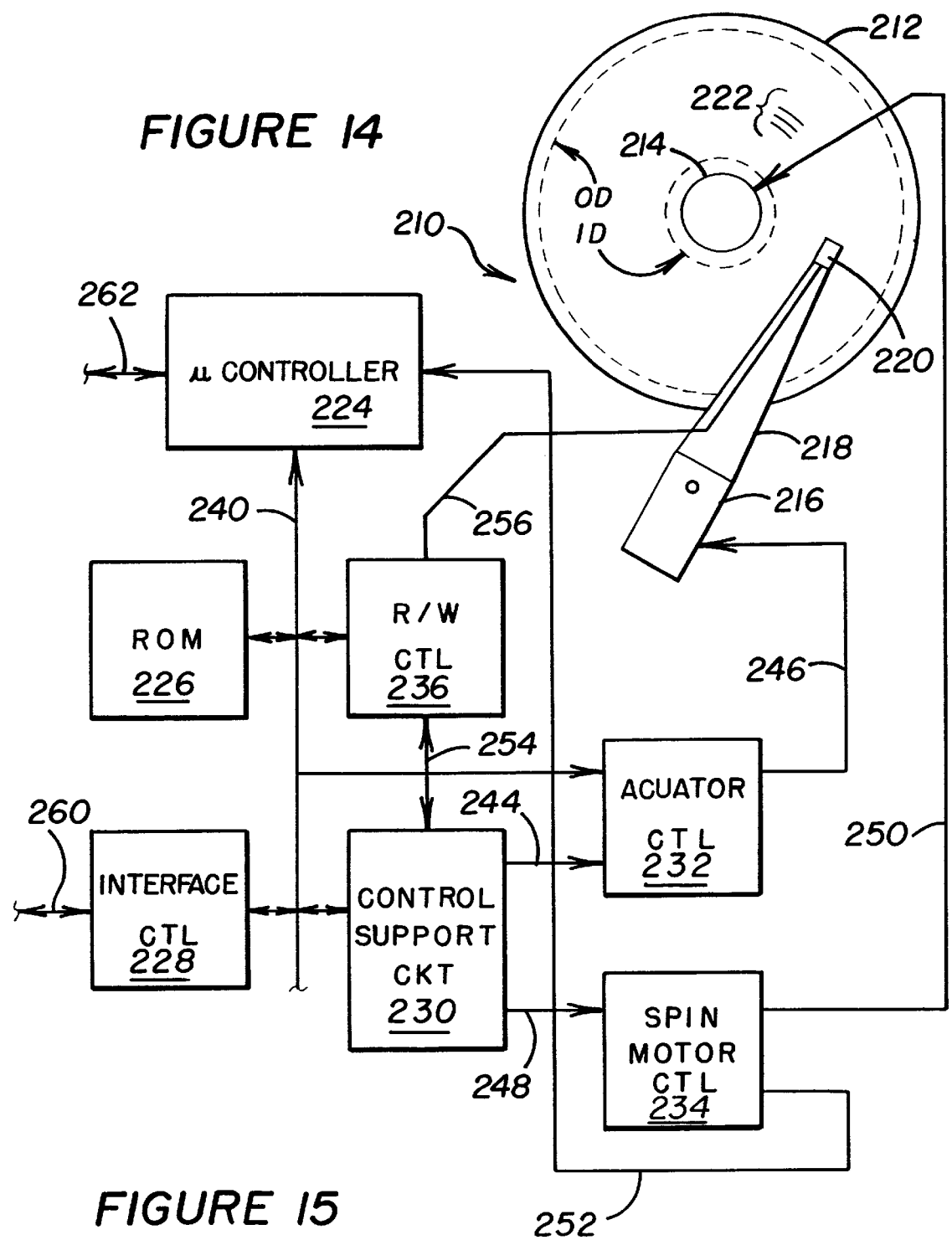
FIG. 14 is a simplified block diagram of a disk drive control system utilized in the disk drive of the present invention.

With reference to FIG. 14, a microcontroller 224 and a minimum number of dedicated control support circuits direct all functions of disk drive 18. In the preferred embodiments of the present invention, microcontroller 224 is a three megahertz clock rate Motorola MC68HC11 HCMOS single chip microcontroller, as described in the MC68HC11A8 HCMOS Single Chip Microcomputer Technical Data Book (ADI 1207) available from Motorola, Inc., Motorola Literature Distribution, P.O. Box 20912, Phoenix, Ariz., 85036.

A read-only memory (ROM) 226 is coupled to the microcontroller 224 by way of a general purpose data, address and control bus 240. The ROM 226 is utilized to store a microcontroller control program for supporting five principle tasks necessary to implement the full functionality of the disk drive 18. These tasks include interface, actuator, spin motor, read/write and monitor.

An interface control circuit 228 is provided to support the microcontroller 224 in execution of the interface task. The interface controller 228, in a preferred asynchronous SCSI embodiment of the present invention, is implemented as a Cirrus Logic CL-SH250 Integrated SCSI Disk Controller, manufactured and distributed by Cirrus Logic, Inc., and described by their CL-SH250 Technical Data Sheet, available from Cirrus Logic, Inc., 1463 Centre Pointe Drive, Milpitas, Calif. 95035. A synchronous SCSI interface controller, the AIC-6110, is available from Adaptec, Inc., 691 South Milpitas Boulevard, Milpitas, Calif. 95025. An interface controller, suitable for interfacing to the IBM personal computer "AT" peripheral bus, is available from Cirrus Logic, Inc.

The interface controller 228, in general, provides a hardware interface between the disk drive 18 and a host computer system, typically a data processing system, via an SCSI communications bus 260. Thus, the interface controller 228 operates to manage bi-directional data streams between the communications bus 260 and the bus 240.

An actuator controller 232 is provided as an internal interface between the microcontroller 224 and actuator assembly 216. The actuator controller 232 provides for digital-to-analog conversion of a digital position control word and the current buffering of the resultant analog voltage provided on line 246 to the voice coil motor of the actuator assembly 216. The digital position control word, as provided via the bus 240 from the microcontroller 224, represents the desired actuator position. Enabling of the actuator controller 232 in general is provided via the control support circuit 230 via control lines 244. The control support circuit 230, to this end, acts as a parallel port expander for latching a control data word also provided by the microcontroller 224 via the bus 240.

A read/write controller 236 similarly acts as an internal interface between the bus 240 and the read/write heads of the actuator assembly 216 via the raw data lines 256. The read/write controller 236 functions to provide for the buffered serialization/deserialization and data clock encoding/decoding of data. Configuration and initiation of read/write controller 236 functions are performed under the direct control of the microcontroller 224 by the transfer of control and data words to the read/write controller 236 via the bus 240.

Finally, a spin motor controller 234 is provided to directly support the commutation of the spin motor 214 via the commutation current lines 250. Commutation state selection is effected by provision of a digital word from the microcontroller 224 to the control support circuit 230. This digital word is latched and provided on the commutation select lines 248 to the spin motor controller 234. A commutation current is switched by the spin motor controller 234 to a corresponding field winding phase pair of the spin motor 214 via the commutation current lines 250. A voltage proportional to the current conducted through the selected field winding phase pair of the spin motor 214 is provided via the feedback line 252 to an analog-to-digital converter input of the microcontroller 224.

Tables 1 and 2 below specify certain characteristics of disk 212.

TABLE 1

| Number Data Cylinders | 653 cylinders |
|---|---|
| Sectors per Track | 32 sectors |
| Number of Disks | 1 |
| Number of Data Surfaces | 2 |
| Bytes per Sector | 662 bytes |
| Data Bytes per Sector | 512 bytes |
| Data Capacity per Data Surface | 10 Mbytes |
| Total Data Capacity | 20 Mbytes |

TABLE 2

| Disk Diameter | 65 millimeters |
|---|---|
|  | 2.65 inches |
| Data Track Band Width | 10 millimeters |
|  | 0.393 inches |
| Track Density | 1700 tracks/inch |
| Bit Density (max) | 22,000 fci |
| Head Width | 11 micrometers |
| Track Width | 15 micrometers |

Figure 15:
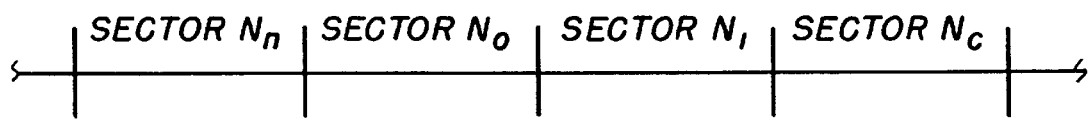
FIG. 15 is a simplified representation of a portion of a data track with the plurality of sectors provided thereon.

As generally represented in FIG. 15, each track of the concentric data tracks 222 provided on the surface of a disk 212 are further subdivided into sectors $N_{0-n}$. In accordance with the present invention, and as generally shown in FIG. 16A, each sector is composed of a servo 1 field, a data 1 field, first error correction code (ECC) field, mid-sector gap field, servo 2 field, data 2 field, second ECC field, and final gap field. As shown in FIG. 16B, the servo 1 field is further composed of a servo mark field, gray code field, servo burst field, ID sync field, ID field, and data sync field. Similarly, the servo 2 field is composed of a second sector mark field, second gray code field, and servo burst field and finally, a data sync field. The order and size of these fields are set forth in Table 3.

TABLE 3

| Half Sector "A" Field | Bytes | Half Sector "B" Field | Bytes |
|---|---|---|---|
| Servo Sync | 3 | Servo Sync | 3 |
| Gray Code | 8 | Gray Code | 8 |
| Servo Burst A | 4 | Servo Burst A | 4 |
| Servo Burst B | 4 | Servo Burst B | 4 |
| Servo Burst C | 4 | Servo Burst C | 4 |
| Servo Burst D | 4 | Servo Burst D | 4 |
| Pad | 1 | Pad | 1 |
| ID Sync | 12 | Data Sync | 12 |
| ID (Header) | 4 | Data | 267 |
| ID CRC | 2 | ECC | 7 |
| Pad | 4 | Gap | 17 |
| Data Sync | 12 |  |  |
| Data | 245 |  |  |
| ECC | 7 |  |  |
| Gap | 17 |  |  |
| 331 Bytes (1st half) |  |  |  |
|  |  | 662 Bytes Total |  |

The sector mark fields are provided to synchronize the microcontroller with the control information present in the remaining portions of the servo 1 and 2 fields as well as the data 1 and 2 fields. The gray code fields provide an unambiguously encoded track number. The unambiguous coding of the gray code values is further qualified in that the gray code values like sectors on adjacent tracks differ by a single bit and that no more than two consecutive zero bits are allowed in a valid gray code value.

The servo burst fields, in accordance with the preferred embodiments of the present invention, are sequentially arranged burst fields of constant amplitude and constant frequency offset in a pre-defined pattern from the center line of the data sector.

The ID sync field of the servo 1 field is also written at constant frequency and voltage, though centered on the track center line. The ID sync field allows the read/write controller to distinguish the first bit of the ID field. The ID field is used to store the cylinder, sector and head numbers.

Finally, the data sync fields are constant frequency and amplitude fields provided to define the first bits of the respective data fields 1 and 2. The read/write controller synchronizes to the frequency of the data sync field. The first discontinuity in the sync frequency is therefore taken as the first data representative transition.

Referring now to FIG. 17, task execution as performed by the microcontroller 224 is shown mapped against the real time occurrence of the servo 1 and 2 fields with respect to a read/write head 220.

Specifically, a sector task is initiated in response to a countdown timer interrupt just prior to the occurrence of the servo 1 field. From this interrupt, the microcontroller 224 enables the control support circuit 230 to detect and process the sector mark field. A control value is then provided to the spin motor controller 234 to commutate the spin motor 214.

As shown in FIG. 18, the sector mark field itself is composed of a servo sync field followed by the sector mark. The servo sync field is another constant amplitude constant and frequency field. The sector mark is defined as the first read data transition following the absence of any servo sync transitions for at least three servo sync clock cycles. The time of occurrence of the sector mark is recorded by a hardware timer within the microcontroller 224 for use in subsequent tasks as well as scheduling the countdown timer interrupt necessary for processing the servo 2 field.

Crash stops are provided to limit the pivoting movement of actuator arm 56 so that heads 46 travel only between the inside and outside diameters 80, 82 of disk 44. Outside diameter crash stop is provided by a hollow plastic sleeve 110 which slides into holes in top and bottom plates 102, 104. When the pivoting motion of actuator arm 56 places heads 46 at the outside diameter 82 of disk 44 crash tab 62a of actuator sub-arm 62 contacts outside diameter crash stop 110, thereby preventing movement of the heads 46 beyond the outside diameter 82. Sleeve 110 may be removed to allow actuator arm 56 to pivot so that heads 46 are not over disk 44, thereby permitting removal of disk 44. Outside diameter crash stop 110 is oriented in the disk drive by orienting a dimple (not shown) in bottom plate 104 with a pocket (not shown) in base 20 coupled with the positioning of bottom plate 104 by the positioning of bearing cartridge 52. An inside diameter crash stop is provided by the portion of the magnetic latch mechanism and is described below.

Spin motor 50 is a rotating shaft motor in which a stator assembly 66 including stator lamination 68 is glued into an opening in base 20. First and second bearings 70, 72 rotatably mount shaft 74 in the stator assembly 66. The use of a rotating shaft motor, opposed to a stationary shaft motor, reduces the friction attributable to the bearings 70, 72, since the rotation of the inner race (not shown) of each bearing 70, 72 as opposed to the outer race (not shown) causes fewer rotations of the ball bearings between the inner and outer races. A hub 76 provided on shaft 24 supports disk 44 and rotor 78. The rotor 78 may comprise a multi-pole ring magnet 29.

Bearings 70, 72 are preloaded by using the following procedure: Bearings 70, 72 and shaft 74 are assembled with stator assembly 66; then, a preload tool is utilized to force the outer races of each of bearings 70, 72 towards each other with a specified amount of force and to maintain this relationship while the outer races are glued to stator assembly 66.

Heads 46 are supported by the suspension system which allows the heads 46 to "fly" over the surfaces of disk 44 on the air flow created by rotation of disk 44. The suspension system includes a baseplate 88, a load beam attached to the actuator arm 56 by baseplate 88, a flexure 92 attached to the load beam 90, and a head 46 supported by the flexure. The most important function of a flexure 92 is to provide a gimbaling action which allows the head 46 to fly flat, i.e., to orient the surface of the head 46 facing the disk 44 so that it is parallel to the surface of the disk while the disk is rotating and the flexure is under load.

The flexure which is the industry standard for 5¼ inch and 3½ inch disk drives was designed by IBM and has remained unchanged for a substantial period of time. The conventional IBM flexure provides the appropriate support for a conventional head having a length of 0.165 inches, a width of 0.125 inches, and a thickness of 0.039 inches.

In a conventional flexure, the gimbal action is provided by a dimple on the flexure which interacts with the load beam. In the conventional design, the gimbal (or pivot) point is approximately 0.033 inches from the surface of the head. In order to position the head so that the head is parallel to the surface of the disk when attached to a load beam which is angled with respect to the disk, the flexure includes a cut-out portion which is placed at a small angle with respect to the body of the flexure when the dimple, which is a component of the cut-out portion, is in contact with the load beam. The head is attached to the cut-out portion. In particular, the cut-out portion of the flexure is at an angle of 1°30' with respect to the axis of the remaining portion of the flexure.

Conventional suspension systems are designed to operate with a head weighing 47 mg and to provide a 9 gram load. A 47 mg head having a 9 gram load is able to withstand shocks of approximately 50 gs.

Several problems are attributable to conventional suspension systems and heads: (i) The large footprint of conventional heads causes portions of the disk at the inside and outside diameters to be unusable for storing data. The large footprint is attributable to the slider on which the magnetic element used to read and write data is mounted. The combined structure of the slider and the magnetic element is known as a head. The loss of data area becomes more critical as the size of disk drives is decreased; and (ii) a 9 gram load presents a large amount of friction between the head and the disk, requiring the disk drive motor to develop enough torque to overcome this friction until the disk is rotating fast enough to cause the head to fly. Higher torque motors require greater power consumption, hampering efforts to reduce the overall power consumption of a disk drive.

New thin film heads having a length of 0.110 inches, a width of 0.089 inches, and a height of 0.020–0.025 inches and weighing only 11 mg have been developed. These new heads, which include a micro-slider and a thin-film magnetic element provided on the micro-slider, have a smaller footprint than conventional heads, and allows more of the disk surface to be utilized for data storage. Further, an 11 mg head provides better resistance to physical shocks even with smaller loading. For example, an 11 mg head under a 5 gram load can withstand approximately 100 gs. The reduced load in turn results in reduced friction between the head and the disk allowing lower torque, and thus lower power motors to be employed.

The conventional flexure is not compatible with the new thin film head. The conventional flexure covers the entire new head and therefore, the wires which interconnect the head with the other elements of the disk drive cannot be routed out. In particular, since the flexure is fabricated from thin metal stock (to provide the appropriate physical characteristics) the edges of the flexure are too sharp to risk routing wires past these edges.

The challenge in developing a new flexure 92 (FIGS. 9 and 10) was three-fold: First, it was important to provide the a gimbaling action similar to that provided by the conventional flexure. Second, compatibility with the smaller thin film head and the 2.5" form factor. Third, although not critical, it was desired that the new flexure have the same distance between the point where the flexure mounts to the load beam and the position of the head as a conventional flexure.

Flexure 92 has a reduced width W with respect to the conventional flexure, and a reduction in the distance $l_1+l_3$ from the mounting point of the head 46 to the end of the flexure 92 which allows the wire routing problems to be solved since flexure 92 does not cover the entire head 46.

Further, in flexure 92, the ratio of the length of the portion of flexure 92 which flexes $l_2$ to the distance $l_3$ between the two mounting points (the mounting point of head 46 and the attachment to the load beam 90) has been increased. This larger ratio of lengths provides flexure 92 with flexing (gimbaling) characteristics which are believed to be comparable to those of a conventional flexure, but uses only the portion of flexure 92 between the two mounting points to provide these characteristics. On the other hand, the conventional flexure uses the portion of the flexure which extends beyond the head to provide its flexing characteristics.

The combination of these features enables the new thin film head to be used with a drive having a 2.5" form factor and in which the base plate and load beam 90 have been scaled to ⅔ of the normal size.

In the design of flexure 92, the cut-out portion 94 is subject to flexing which decreases the angle between the cut-out portion 94 and the body of flexure 92. Accordingly, the angle between the cut-out portion 94 and the body of flexure 92 must be increased from the standard 1°30' to 2°30'.

A reverse flex circuit 120 (FIG. 2) carries electrical signals from header pins 42 to heads 46 and actuator assembly 48. The reverse flex circuit 120 may be separated into three portions (not shown); a first portion carrying current to actuator coil 58 and a second portion which is a ground plane separating the current carrying portion from a third data carrying portion. The data carrying portion of flex circuit 120 provides signals to heads 46 for recording information on disk 44 and carries signals from the heads 46 to the printed circuit assembly 36, via header 40. The ground plane prevents interference with the relatively weak data signals which would otherwise be caused by the larger currents necessary for actuator coil 58 passing through the first portion of the reverse flex circuit 120.

Reverse flex circuit 120 is designed to exert only a minimal amount of rotational force (torque) on the actuator arm 56. Any torque exerted on actuator arm 56 by any means other than the voice coil motor affects the function of actuator assembly 48 in positioning heads 46 with respect to disk 44, particularly the track following and seek functions described in the above-identified co-pending applications, Ser. Nos. 057,806 and 058,289. The force provided by the voice coil assembly must be controlled to compensate for the force exerted by the reverse flex circuit 120.

The use of a magnetic field to park the heads in a disk drive, as opposed to a mechanical latch, eliminates the need for an electromagnetic or air activated device to release the mechanical latch during operation of the disk drive. A magnetic parking unit 140 (FIGS. 2 and 11–13) includes a finger 142 provided on sub-arm 60, a magnet 144, and a magnetic field containing member 146 provided by a portion of support member 106 for containing and providing a return for the magnetic field produced by the magnet 144. An air gap (or slot) 148 in the field containing member 146 provides a region of high magnetic field intensity. The actuator of a disk drive is captured when the magnetically permeable finger 142 enters the air gap 148. The magnetic field in the air gap 148 of field containing member 146 captures (capture member) 142 to retain actuator arm 56 and to park the heads 46 without contact between capture member 142 and magnet 144. The disk drive is constructed so that the head(s) are parked when the actuator is captured.

During power-down of the disk drive the circuitry on printed circuit board 36 causes actuator assembly 48 to pivot the actuator arm 56 to the position where the heads 46 are over the landing zone 84 of disk 44 before the rotational speed of the disk 44 is decreased to the point where the heads 46 land on the disk 44.

Finger 142 enters air gap 148 in field containing member 146 when the actuator arm 56 is pivoted so that heads 46 are positioned over the landing zone 84. The field containing member 146 is positioned so that it is outside of the magnetic flux circuits of fields $\vec{B}_1$, $\vec{B}_2$ produced by magnet 108. These magnetic flux circuits are contained in the top and bottom plates 102, 104. Magnetic field containing member 146 comprises the portion of support 106 outside of the gap between top and bottom plates 102, 104.

Figure 12:
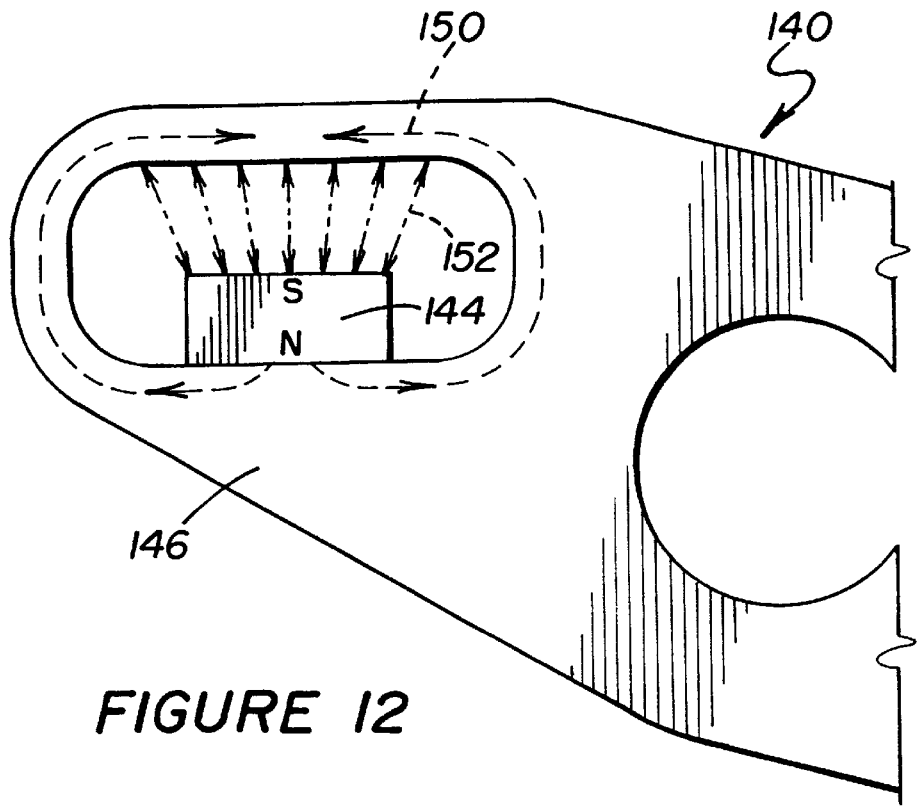
FIG. 12 is a cross-section view along line 12—12 in FIG. 11.
Figure 11:
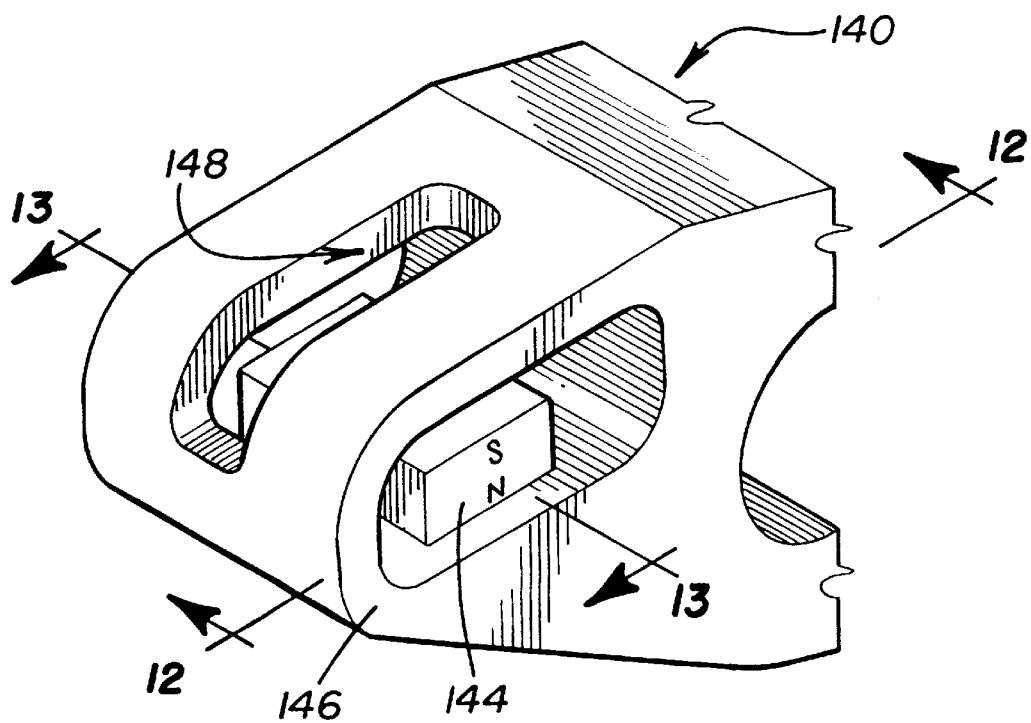
FIG. 11 is an isometric view of a field containing member for a magnetic latch mechanism useful in the disk drive of the present invention.

A field containing member 146 having an air gap 148 oriented in a direction substantially parallel to the magnetic flux lines 150 in field containing member 146 substantially alleviates fringing (or leakage) of the magnetic flux created by magnet 144 outside of air gap 148. As shown in FIGS. 11 and 12, flux lines 150 of the field in field containing member 146 are substantially parallel to air gap 148. The flux lines 152 of the field which pass from the south pole of magnet 144 to field containing member 146 all pass between magnet 144 and field containing member 146; none of the flux lines 152 extend outside of the physical boundaries of field containing member 146.

Figure 13A:
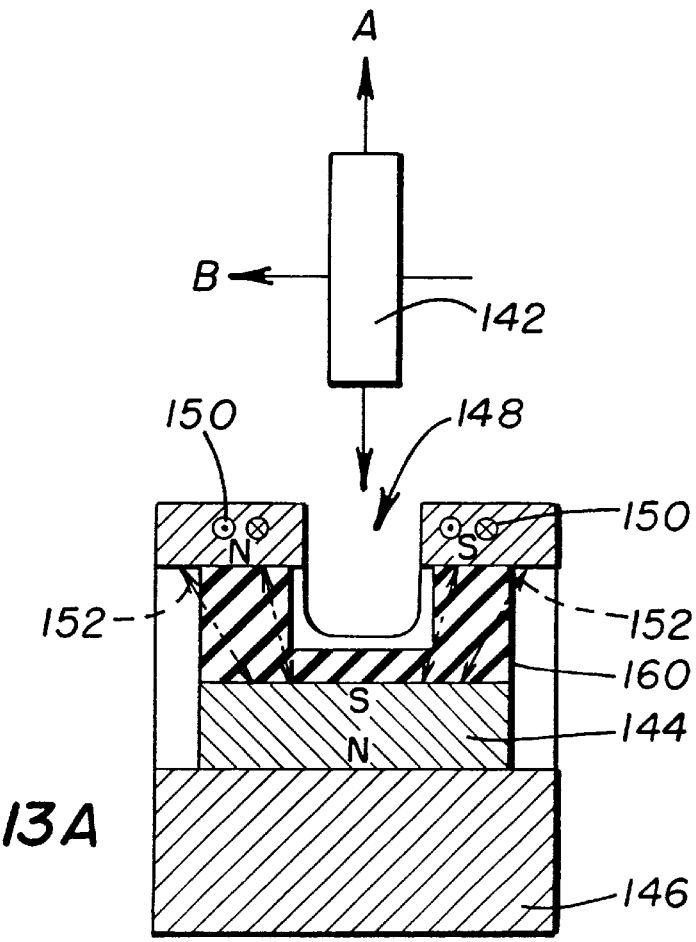
FIGS. 13A and B are cross-sectional views along line 13—13 in FIG. 11, for describing the operation of the magnetic latch mechanism.
Figure 13B:
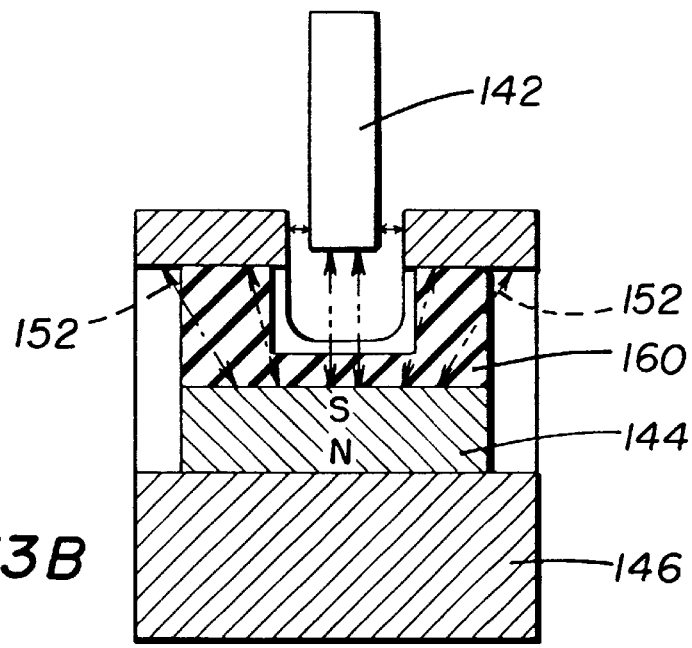

The interaction of magnetic parking unit 140 and capture member 142 creates a magnetic switch. With reference to FIGS. 13A, capture member 142 is non-permeated when capture member 142 is outside of air gap 148. As capture member 142 enters air gap 148 (FIG. 13B), the capture member 142 switches to a permeated state. Capture member 142 thus becomes an integral part of the magnetic circuit—the flux paths 150 and 152—created by magnet 144, and is pulled towards the south pole S of magnet 144 and towards the north pole N of field containing member 146 at the edges of air gap 148. This structure also provides a so-called "black hole" magnetic effect. The result of the black hole magnetic effect is that actuator arm 56 is unaffected by magnetic unit 140 until capture member 142 enters air gap 148.

The pivoting motion of actuator arm 56 allows capture member 142 to move along axis A (FIG. 13A); however, the actuator bearing cartridge 54 prevents motion of capture member 142 in axis B. The magnetic forces attempting to move capture member along axis B and the magnetic force attracting capture member 142 towards magnet 144 result in a strong holding force which retains capture member 142 in air gap 148. Bumper 160 limits the travel of capture member 142 (and thus actuator arm 56) along axis A. The holding force is determined by the geometric proportions of the various elements which comprise the magnetic circuit (including field containing member 146 and capture member 142), the strength of the magnetic field in air gap 148, and the thickness of bumper 160. Bumper 160 controls the distance between magnet 14 and capture member 142 and prevents these two elements from contacting each other.

The elimination of fringing allows more of surface of disk 44 to be utilized for data storage.

Bumper 160 functions as an inside diameter crash stop. Bumper 160 is formed of a cushioning material, e.g., rubber or foam, which does not introduce an appreciable quantity of particles into the environment of the disk drive.

Actuator arm 56 is released from the magnetic parking unit 140 by the force generated by actuator assembly 48. The need for a spring to bias a mechanical latch and an electromagnetic unit which continually draws current during operation of the disk drive to release a mechanical latch mechanism are eliminated.

The many features and advantages of the disk drive of the present invention will be apparent to those skilled in the art from the Description of the Preferred Embodiments and the Drawings. Thus, the following claims are intended to cover all modifications and equivalents falling within the scope of the invention.

What is claimed is:

1. A disk drive responsive to a host computer, comprising:
   a head-disk assembly, including:
      a base having a top, a bottom, a length corresponding to sides of said base, and a width corresponding to ends of said base, said width being less than said length,
      four support posts provided on said base spaced inward from said ends for securing the disk drive within the host computer, said four support posts capable of providing a quadrilateral area on said base, said four support posts being at corners of said quadrilateral area, said quadrilateral area having an increased rigidity upon the disk drive being secured to the host computer,
      storage means for storing data, said storage means having an outline and said storage means mounted at a point on said base within said quadrilateral area of increased rigidity,
      interactive means for reading information from and writing information on said storage means,
      actuator means, supported on said base and responsive to control signals, for positioning said interactive means with respect to said storage means and for limiting motion of said interactive means to positions within a region defined by said outline of said storage means, said actuator means being mounted at a point on said base within said quadrilateral area of increased rigidity, and
      a cover sealably attached to said base to enclose said storage means, said interactive means, and said actuator means; and
   control means, mounted on said bottom of said base, for generating control signals to control said actuator means and for providing information signals to and receiving information signals from said interactive means.

2. A disk drive according to claim 1, wherein said storage means for storing data comprises a plurality of storage disks.

3. A disk drive responsive to a host computer, comprising:
   a base having sides and ends defining a length and a width, respectively, of the disk drive;
   four support posts provided on said base spaced inward from said ends for securing the disk drive within the host computer, said four support posts capable of providing a quadrilateral area on said base, said four support posts being at corners of said quadrilateral area, said quadrilateral area having an increased rigidity upon the disk drive being secured to the host computer;
   a disk having an inside diameter and an outside diameter, said disk mounted at a point on said base within said quadrilateral area of increased rigidity;
   interactive means for reading information from and writing information on said disk;
   actuator means, responsive to control signals, for positioning said interactive means in a region bounded by said inside and outside diameters of said disk, said actuator means being mounted at a point on said base within said quadrilateral area of increased rigidity; and
   control means mounted immediately adjacent a bottom surface of said base for generating control signals to control said actuator means and for providing information signals to and receiving information signals from said interactive means.

4. A disk drive according to claim 3, wherein said outside diameter of said disk is approximately 2.56".

5. A disk drive responsive to a host computer, comprising:
   a base having ends corresponding to a width of said base and sides corresponding to a length of said base;
   a cover mating with said base and having substantially the same length and width as said base;
   a plurality of support posts provided on said base spaced inward from said ends for securing the disk drive within the host computer, said plurality of support posts capable of providing an area on said base defined by said plurality of support posts with an increased rigidity upon the disk drive being secured to the host computer;
   a disk having a plurality of tracks for storing data and a landing zone, said disk being mounted at a point on said base within said area of increased rigidity;
   a spin motor for mounting said disk on said base and for rotating said disk;
   at least one head for interacting with said disk to read data from and record data on said tracks;
   actuator means for supporting said head adjacent to said disk, for positioning said head with respect to said disk, and for limiting the travel of said head to positions over said plurality of tracks and said landing zone, said actuator means being mounted at a point on said base within said area of increased rigidity; and
   a printed circuit board, said printed circuit board having circuitry for controlling said actuator means to position said head over a selected one of said tracks and for controlling said spin motor, said base.

6. A disk drive responsive to a host computer as recited in claim 5, further comprising
   a connector, confined within the length and width of said base and cover, for providing an interface between said disk drive and the host computer.

7. A disk drive as recited in claim 5, further comprising a flexure mounted on said actuator means and contacting said at least one head for positioning a surface of said at least one head juxtaposed to said disk in a parallel relation with said disk, which flexure has a width less than that of said at least one head.

8. A disk drive responsive to a host computer, comprising:
   a head-disk assembly, including:
      a base having a top, a bottom, a length corresponding to sides of said base, and a width corresponding to ends of said base, said width being less than said length;
      four support posts provided on said base spaced inward from said ends for securing the disk drive within the host computer, said four support posts capable of providing an area on said base defined by said four support posts with an increased rigidity upon the disk drive being secured to the host computer,
      storage means for storing data, said storage means mounted at a point on said base within said area of increased rigidity,
      interactive means for reading information from and writing information on said storage means,
      actuator means, supported on said base and responsive to control signals, for positioning said interactive means with respect to said storage means, said actuator means being mounted at a point on said base within said area of increased rigidity, and
      a cover sealably attached to said base to enclose said storage means, said interactive means, and said actuator means; and
   control means, mounted on said bottom of said base, for generating control signals to control said actuator means and for providing information signals to and receiving information signals from said interactive means.

9. A disk drive responsive to a host computer as recited in claim 8, further comprising a connector, confined within the length and width of said base and cover, for providing an interface between the disk drive and the host computer.

10. A disk drive responsive to a host computer as recited in claim 8, wherein said control means is confined within said length and width of said base.

11. A disk drive responsive to a host computer, comprising:
- a base having sides and ends defining a length and a width, respectively, of the disk drive;
- a first pair of support posts provided on said base and spaced inward from said ends of said base for securing the disk drive within the host computer, a first line being defined between support posts of said first pair of support posts, said first line being substantially parallel to said ends of said base;
- a second pair of support posts provided on said base and spaced inward from said ends of said base for securing the disk drive within the host computer, a second line being defined between support posts of said second pair of support posts, said second line being substantially parallel to said ends of said base;
- at least one disk having an inside diameter and an outside diameter, said at least one disk rotationally mounted on said base about a first axis substantially intersecting said first line;
- interactive means for reading information from and writing information on said at least one disk;
- actuator means, responsive to control signals, for positioning said interactive means in a region bounded by said inside and outside diameters of said at least one disk, said actuator means being pivotally mounted about a second axis substantially intersecting said second line; and
- control means mounted to a bottom surface of said base for generating control signals to control said actuator means and for providing information signals to and receiving information signals from said interactive means.

12. A disk drive responsive to a host computer, comprising:
- a base having sides and ends defining a length and a width, respectively, of the disk drive;
- a pair of support posts provided on said base and spaced inward from said ends of said base for securing the disk drive within the host computer, a line being defined between support posts of said pair of support posts, said line being substantially parallel to said ends of said base;
- at least one disk having an inside diameter and an outside diameter, said at least one disk rotationally mounted on said base about an axis substantially intersecting said line;
- interactive means for reading information from and writing information on said at least one disk;
- actuator means, responsive to control signals, for positioning said interactive means in a region bounded by said inside and outside diameters of said at least one disk; and
- control means mounted to a bottom surface of said base for generating control signals to control said actuator means and for providing information signals to and receiving information signals from said interactive means.

13. A disk drive responsive to a host computer, comprising:
- a base having sides and ends defining a length and a width, respectively, of the disk drive;
- a pair of support posts provided on said base and spaced inward from said ends of said base for securing the disk drive within the host computer, a line being defined between support posts of said pair of support posts, said line being substantially parallel to said ends of said base;
- a disk rotationally mounted on said base and having an inside diameter and an outside diameter;
- interactive means for reading information from and writing information on said disk;
- actuator means, responsive to control signals, for positioning said interactive means in a region bounded by said inside and outside diameters of said disk, said actuator means being pivotally mounted about an axis substantially intersecting said line; and
- control means mounted to a bottom surface of said base for generating control signals to control said actuator means and for providing information signals to and receiving information signals from said interactive means.

14. A disk drive responsive to a host computer, comprising:
- a metal base having sides and ends defining a length and a width, respectively, of the disk drive;
- a plastic cover mating with said base;
- a first pair of support posts provided on said base and spaced inward from said ends of said base for securing the disk drive within the host computer, a first line being defined between support posts of said first pair of support posts, said first line being substantially parallel to said ends of said base;
- a second pair of support posts provided on said base and spaced inward from said ends of said base for securing the disk drive within the host computer, a second line being defined between support posts of said second pair of support posts, said second line being substantially parallel to said ends of said base;
- a disk having an inside diameter and an outside diameter, said disk rotationally mounted on said base about a first axis substantially intersecting said first line;
- interactive means for reading information from and writing information on said disk;
- actuator means, responsive to control signals, for positioning said interactive means in a region bounded by said inside and outside diameters of said disk, said actuator means being pivotally mounted about a second axis substantially intersecting said second line; and
- control means mounted to a bottom surface of said base for generating control signals to control said actuator means and for providing information signals to and receiving information signals from said interactive means.

15. A disk drive responsive to a host computer, comprising:
- a metal base having sides and ends defining a length and a width, respectively, of the disk drive;
- a plastic cover mating with said base;

four support posts provided on said base spaced inward from said ends for securing the disk drive within the host computer, said four support posts capable of providing a quadrilateral area on said base defined by said four support posts with an increased rigidity upon the disk drive being secured to the host computer;

a disk having an inside diameter and an outside diameter, said disk mounted at a point on said base within said quadrilateral area of increased rigidity;

interactive means for reading information from and writing information on said disk;

actuator means, responsive to control signals, for positioning said interactive means in a region bounded by said inside and outside diameters of said disk, said actuator means being mounted at a point on said base within said quadrilateral area of increased rigidity; and control means mounted to a bottom surface of said base for generating control signals to control said actuator means and for providing information signals to and receiving information signals from said interactive means.

* * * * *